US010848779B2

(12) United States Patent
Fu et al.

(10) Patent No.: US 10,848,779 B2
(45) Date of Patent: *Nov. 24, 2020

(54) TEMPORAL MOTION VECTOR PREDICTION CONTROL IN VIDEO CODING

(71) Applicant: Intel Corporation, Santa Clara, CA (US)

(72) Inventors: Fangwen Fu, Folsom, CA (US); Jill M. Boyce, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,275

(22) Filed: Oct. 28, 2019

(65) Prior Publication Data

US 2020/0068216 A1  Feb. 27, 2020

Related U.S. Application Data

(63) Continuation of application No. 15/714,808, filed on Sep. 25, 2017, now Pat. No. 10,542,279.

(51) Int. Cl.
*H04N 19/52* (2014.01)
*H04N 19/105* (2014.01)
*H04N 19/70* (2014.01)
*H04N 19/82* (2014.01)

(52) U.S. Cl.
CPC ........... *H04N 19/52* (2014.11); *H04N 19/105* (2014.11); *H04N 19/70* (2014.11); *H04N 19/82* (2014.11)

(58) Field of Classification Search
CPC ...... H04N 19/52; H04N 19/70; H04N 19/105; H04N 19/82

USPC .................................................... 375/240.16
See application file for complete search history.

(56) References Cited

U.S. PATENT DOCUMENTS

| 9,185,408 | B2* | 11/2015 | Yu ........................ H04N 19/105 |
| 9,300,963 | B2 | 3/2016 | Lin et al. |
| 9,525,879 | B2 | 12/2016 | Lin et al. |
| 2010/0195721 | A1 | 8/2010 | Wu et al. |

(Continued)

OTHER PUBLICATIONS

Yan et al, Multiview video plus depth coding and inter component prediction in high level syntax extension of H.265/HEVC (Year: 2013).*

(Continued)

*Primary Examiner* — Shan E Elahi
(74) *Attorney, Agent, or Firm* — Green, Howard & Mughal LLP.

(57) ABSTRACT

Temporal motion vector prediction control is described in video coding. In one example, a method includes receiving a plurality of frames representing encoded video, parsing an uncompressed header for each frame, determining whether a temporal motion vector prediction command is included within the parsed uncompressed header of a first frame, selecting a reference frame from a reference list of frames, retrieving motion vector information from the selected reference frame, performing temporal motion vector prediction on the first frame corresponding to the parsed uncompressed header if a temporal motion vector prediction command is included within the parsed header to form a motion predicted frame, applying a loop filter to the motion predicted frame, and rendering the frame as decoded video.

25 Claims, 5 Drawing Sheets

(56) References Cited

U.S. PATENT DOCUMENTS

| | | | |
|---|---|---|---|
| 2013/0188716 A1* | 7/2013 | Seregin | H04N 19/50 375/240.16 |
| 2013/0208804 A1 | 8/2013 | Lin et al. | |
| 2013/0215977 A1 | 8/2013 | Zhao et al. | |
| 2013/0336384 A1 | 12/2013 | Yu et al. | |
| 2014/0086325 A1* | 3/2014 | Chen | H04N 19/61 375/240.14 |
| 2014/0086328 A1 | 3/2014 | Chen et al. | |
| 2014/0092978 A1* | 4/2014 | Bugdayci | H04N 19/30 375/240.16 |
| 2014/0105299 A1* | 4/2014 | Chen | H04N 19/597 375/240.15 |
| 2014/0218473 A1* | 8/2014 | Hannuksela | H04N 19/597 348/43 |
| 2014/0301463 A1 | 10/2014 | Rusanovskyy et al. | |
| 2014/0301467 A1 | 10/2014 | Thirumalai et al. | |
| 2014/0321560 A1* | 10/2014 | Ugur | H04N 19/187 375/240.29 |
| 2015/0055704 A1 | 2/2015 | Zhang et al. | |
| 2015/0085935 A1 | 3/2015 | Chen et al. | |
| 2015/0103921 A1* | 4/2015 | Hannuksela | H04N 19/433 375/240.26 |
| 2015/0195572 A1 | 7/2015 | Chen | |
| 2016/0173872 A1 | 6/2016 | Lin et al. | |
| 2018/0098062 A1 | 4/2018 | Li et al. | |
| 2018/0098079 A1 | 4/2018 | Chuang et al. | |
| 2018/0098087 A1 | 4/2018 | Li et al. | |

OTHER PUBLICATIONS

Sansli et al, Inter view motion vector prediction in mulitview HEVC (Year: 2014).*

Notice of Allowance for U.S. Appl. No. 15/714,808, dated Sep. 25, 2019.

Office Action for U.S. Appl. No. 15/714,808, dated Mar. 11, 2019.

Ismaeil, et al., "Efficient motion estimation using spatial and temporal motion vector prediction", Proceedings of International Conference on Image Processing, Oct. 24-28, 1999.

Purica, et al., "Multiview plus depth video coding with temporal prediction view synthesis", IEEE Transactions on Circuits and Systems for Video Technology; vol. 26, No. 2, 2016.

Rao, et al., "Temporal motion prediction for fast motion estimation in multiple reference frames", IEEE International Symposium on Signal Processing and Information Technology, 2006.

* cited by examiner

FIG. 1

DISPLAY ORDER

FIG. 2

CODING ORDER

FIG. 3

CODING ORDER

FIG. 4
LAYER 1 IS REMOVED FOR DECODING

FIG. 5
LAYER 1 IS AVAILABLE FOR DECODING

FIG. 6
LAYER 1 IS AVAILABLE FOR DECODING

TEMPORAL MOTION VECTOR PREDICTION CONTROL IN VIDEO CODING

CLAIM FOR PRIORITY

This application is a continuation of U.S. patent application Ser. No. 15/714,808, filed on Sep. 25, 2017, and entitled "TEMPORAL MOTION VECTOR PREDICTION CONTROL IN VIDEO CODING", which is incorporated by reference in its entirety herein for all purposes.

FIELD

The present description relates to video encoding and decoding and, in particular to controlling the use of temporal motion vector prediction.

BACKGROUND

The prevalence of ever more portable and higher resolution cameras has led to a growing desire to send and receive video. At the same time portable and connected media players are a part of many devices, including smart phones and watches. Home viewers and mobile users are being provided with high quality video on demand but this requires a significant part of the transmission ability of wireless and wired date services. As a result, there is pressure for more efficient and higher quality video compression and decompression techniques.

Newer coding standards allow perceptually better video to be transmitted using less data. MPEG (Motion Pictures Experts Group) standards are being replaced with newer techniques such as H.265/HEVC (High Efficiency Video Coding) from the Joint Collaborative Team on Video Coding (JCT-VC), VP9 of Google/YouTube, and AV1 (AOMedia Video 1) of AOpen (Alliance for Open Media). These and other codecs present different characteristics for different markets but also use many of the same principles.

The VP9 standard, among others, allows multiple difference reference frames to be used when coding a particular frame. Frames are encoded in blocks that represent groups of pixels. In order to reduce the information required for a block, the block may be described with respect to how it differs from a nearby block of the same frame (spatial) or with respect to how it differs from a corresponding block in a previous frame (temporal). In some encoders, the description of this difference is referred to as a motion vector. The motion vector expresses how a block has changed or moved from the reference block. Typically, the motion vector is a two-dimensional vector used for inter prediction which refers the current frame to the reference frame. The motion vector value provides the coordinate offsets from a location in the current frame to a location in the reference frame. With any motion vector there is an express or implied reference index for each block to indicate which previous reference frame from a reference frame list is to be used for predicting the current block.

Temporal scalability is another characteristic of many video codecs, such as VP9 or HEVC, each frame is assigned to a particular temporal layer, and cannot refer to a reference frame from a higher temporal layer than the one to which it is assigned. The restriction against using frames from higher temporal layers allows higher temporal layer frames to be discarded by a decoder or a Media Aware Network Element (MANE) without impacting the decoding of lower temporal layers. Discarding frames reduces the network bandwidth required to deliver the bitstream, the computation resource required to decode the frames in those layers, and the buffer requirements to keep frames. Extra frames can require significant computational and memory resources for small devices or for high resolution video.

Temporal motion vector prediction is a technique used in a decoder to predict a motion vector (MV) in a current frame by using data about the corresponding motion vector from the previous frame. Motion vectors are used extensively in many video codecs including AV1, VP9, and HEVC. When coding the motion vector for a particular block, the motion vector can be predicted from a coded MV in a previously coded frame. On the decoder, however, the referenced previous frame must be available so that the decoder can find the previously coded MV and use it to decode the current frame.

BRIEF DESCRIPTION OF THE DRAWING FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity.

DETAILED DESCRIPTION

In the HEVC standard, temporal motion vector prediction (MVP) is enabled and disabled at the slice level through the signaling flag "slice temporal mvp enabled flag" and the frame containing the temporal motion vector information is specified by the "collocated ref idx" and signaled in a slice header. For MVP to operate the specified frame must be in the frame reference list.

In the VP9 standard and in an early draft of AV1, temporal MVP usage is determined based on other variables, such as the previous frame size, the previous show frame flag, etc. and is not explicitly signaled in the corresponding frame header. Any temporal MV prediction will always use the previous frame's MV information as determined by the coding order of the frames.

The logic to determine temporal MVP usage is expressed in VP9 as follows:

cm→use_prev_frame_mvs=
!cm→error_resilient_mode && cm→width==cm→last_width &&
cm→height==cm→last_height && ! cm→last_intra_only &&
cm→last_show_frame && (cm→last_frame_type!= KEY_FRAME);

This lack of control over the use of MVP can lead to difficulties with the decoding. In the case of temporal scalability, the previous frame in the coding order is often unavailable at the decoder side. If the frame is not available, then MVP will not work and there may be errors or delay in the decoding. In a parallel decoding mode, synchronization is required in the block level between the current frame and the previous frame.

Temporal scalability in some cases refers to scaling the frame rate of a video for playback. The video is encoded at some original frame rate, such as 30 frames per second (fps). In order to reduce system demands for transmission or playback, this original frame rate can be scaled back to 20, 15, or 10 fps, for example. This is most easily done by dropping frames before transmission. For 20 fps, every third frame is dropped. For 15 fps every other frame is dropped, etc. At the decoder, the dropped frames are no longer available for decoding. In typical temporal scalability cases frames have been dropped and are not available to the decoder nor to the display.

Figure 1:
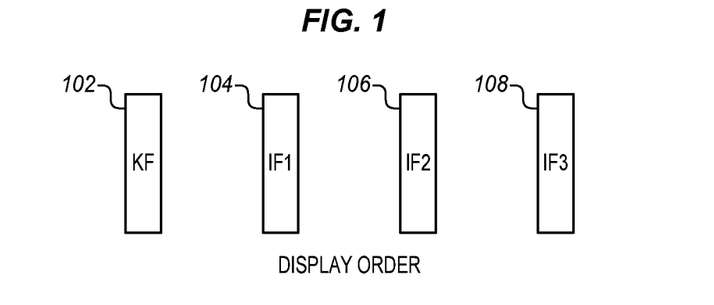
FIG. 1 is a diagram of a sequence of frames to be decoded.

VP9 may be used in a high latency coding configuration, in which non-shown frames are used when coding out of order frames, and there are frames that follow a non-shown frame in coding order. For example, FIG. 1 is a sequence diagram showing a sequence of four frames to be encoded. A first frame 102 is a key frame, followed by three inter frames 104, 106, 108 designated as IF1, IF2, and IF3. Temporal motion vector prediction generates motion vectors starting with the key frame and predicts motion from that starting frame to encode each of the inter frames in sequence. This is inter prediction in which the MVP values for the current frame are derived using the previously decoded frames. In this context, a key frame is a frame for which the decoding process is reset. In other words, a key frame and the frames that follow a key frame are decoded without access to any frames that precede the key frame. A key frame only uses intra (or intra-frame) prediction.

In many decoders, including VP9, the MVP scans blocks of inter frames to predict the motion vectors that will most likely be used for a current block. The scanning may be biased in different ways. Often nearby blocks that are based on the same reference frame will have the same motion vector. The scanning may continue until it finds several different predictions. When the spatial neighbors are not enough, the decoder uses the motion vectors from the previous decoded frame.

In this way multiple predictions can be generated and labeled, such as the nearest motion vector and the near motion vector. The decoder may select one of these or a zero motion vector or a new motion vector. For a new motion vector, the decoder reads a coded motion vector difference from the incoming bitstream and then adds the difference to the nearest motion vector to compute an actual motion vector.

Figure 2:
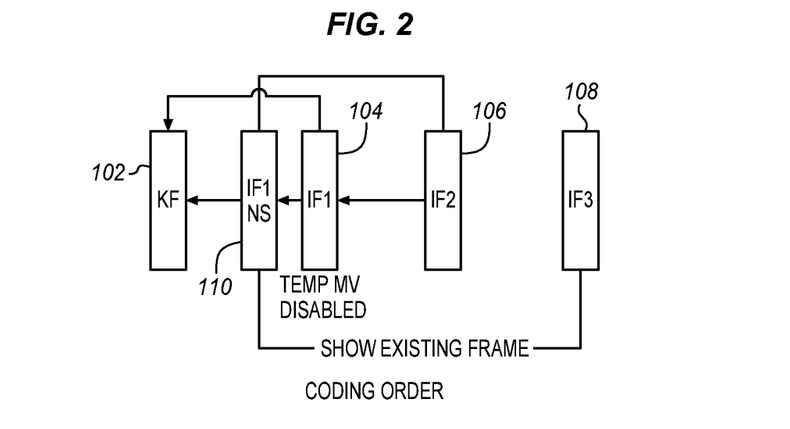
FIG. 2 is a diagram of a sequence of frames to be decoded indicating reference frames for temporal motion vector prediction according to an embodiment.

FIG. 2 shows the same sequence of four frames 102, 104, 106, 108 as in FIG. 1. The arrows show that pixels for a subsequent frame are taken from a previous frame. As shown, pixels for inter frame 1 104 are taken from the key frame and from non-shown inter frame 3. Pixels for inter frame 2 are taken from inter frame 1 and non-shown inter frame 3. Pixels for inter frame 3 are taken from non-shown inter frame 3. Finally pixels for non-shown inter frame 3 are taken from the key frame 102. This use of other frames to build the pixels of subsequent frames is set forth in the standards for the respective decoder and is not directly related to temporal motion vector prediction.

In VP9, in some cases a first intermediate frame IF1 104 follows a non-shown frame (IF3-NS) 110. The frame is non-shown in the sense that it will not be a part of the displayed video. In such a case temporal motion vector prediction has to be disabled as per the specified conditions described above. Temporal scalability conditions which give rise to the non-shown frame are not fully supported in the existing types of standards. For high delay, the frames 104, 106, 108 following the non-shown frames 110 in coding order are not permitted to use temporal mv prediction in the anchor.

Many decoders provide a hidden frame. When a frame is decoded it will normally be shown. The hidden frame can still be saved into the reference frame slots for use in inter prediction of future frames. This can be used to make a golden frame that contains a high quality version of various objects in the scene. The hidden frame can be used as a reference to construct other frames. The hidden frame may also be a very short frame of just a few bytes that provides a control function.

Figure 3:
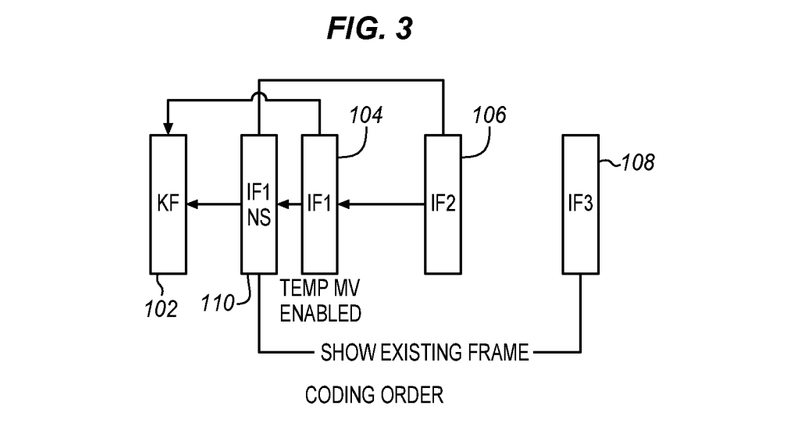
FIG. 3 is a diagram of a sequence of frames to be decoded indicating alternative reference frames for temporal motion vector prediction according to an embodiment.

FIG. 3 shows a variation in which the same four frames 102, 104, 106, 108 occur in sequence again together with the non-shown frame 110. However, in contrast to the specified conditions of VP9 above, temporal motion vector prediction is allowed to be enabled for the IF1 frame. This may improve the coding efficiency. In practice there is a small increase in bit rate due to the use of signaling to enable temporal MVP. There is also a small increase in the memory footprint at the encoder to support the additional use of MVP but no increase in the memory bandwidth used at the encoder.

Using temporal motion vector prediction enabling with frames for which VP9 does not allow it in the standard, additional coding efficiency may be obtained. This is particularly true for high latency coding configurations and temporal scalability. A further benefit is to improve the flexibility of the encoder in enabling and disabling temporal motion vector prediction at the frame level.

Signaling may be used to allow an encoder to enable and disable temporal motion vector prediction (MVP) or any other MVP. The signaling allows the encoder to override any specified conditions, such as the standardized conditions set forth above. As mentioned above, these may be conditions such as the previous frame size, the previous show frame and type, etc.

According to embodiments explicit signaling of temporal MVP may be added at the frame level (uncompressed header) in VP9, AV1 and similar codecs. The uncompressed header in VP9 has a high level description of the frame to be decoded that is encoded without the use of arithmetic encoding. This signaling may be used to engage and to disengage MVP at the frame level. The signaling may be improved by referring to the motion vector information from the LAST frame in the reference list instead of the previous frame in the coding order.

A typical frame of a bitstream may take the form shown in the Table.

TABLE

| FRAME | | | |
|---|---|---|---|
| Uncompressed Header | Compressed Header | Tile 0 | Tile 1 . . . |

The uncompressed header may contain frame level information. The compressed header may be used to specify transform sizes. This is followed by the bytes for each tile of the frame. There may be multiple tiles in a frame and the tile size may be specified on a per-frame basis. The reference frame is usually referred to the frame used for temporal pixel prediction. The LAST frame is the first frame in the reference list. The LAST frame is usually treated as a default reference. This default does not apply in all cases and especially if an explicit reference index is used.

Using temporal motion information from the LAST frame in the reference list is different from the VP9 standard in which the temporal MVP is always based from the previous frame in the coding order. The previous frame is less often available. The described approach differs from the HEVC design in which the temporal motion information is explicitly signaled for each slice. Such explicit signaling increases the overhead unnecessarily.

Explicit frame-wise MVP signaling may be used to eliminate broken frame references and also to improve the coding efficiency for a variety of different video compression systems. As an example, the VP9 temporal MVP design does not work properly with temporal scalability. To avoid errors or latency, temporal MVP must be disabled, by indicating error resiliency mode, for the frames that have a temporal ID smaller than that of the previous frame in the coding order.

As described herein, to support temporal scalability with temporal MVP, temporal MVP may be enabled for a frame that follows a frame that has a higher temporal ID. This is an improvement over VP9 in which temporal MVP is disabled for such frames by indicating the error resiliency mode. This increased flexibility may allow for a small coding gain in a high delay configuration. For temporal scalable conditions there is also a small coding gain because MVP may be used for some frames instead of never being used at all.

The indication of whether temporal MVP is enabled or disabled may be done in a variety of different ways. For VP9, an additional syntax element may be used in the uncompressed header at the frame level, rather than at the slice layer. This makes the information available for each frame. In some embodiments, the syntax element is identified as "allow_temp_mv_prediction." Any of a variety of other names or structures may be used. The element may be combined with other elements depending on the coding system. The element may have values, such as "allow_temp_mv_prediction" equal to 0 indicates that the temporal my prediction is disabled for the current frame. "allow_temp_mv_prediction" equal to 1 may be used to indicate that the temporal my prediction is enabled.

In this way the syntax element is a simple binary ON/OFF command. This simplicity reduces complexity and overhead at the frame level. In some embodiments, it may be used as a command to turn MVP ON for multiple frames without including the syntax element. The MVP status is then changed only when a different value for the syntax element appears in the header for a subsequent frame. As an alternative, the syntax element may be used only to turn ON MVP for a particular frame. In this embodiment the specified conditions operate as the default and the result is modified for a particular frame by including the syntax element in that header as a command to change the condition of ON or OFF. The syntax element may be used as a command to turn temporal MVP ON when it otherwise would be OFF or to turn temporal MVP OFF when the specified conditions would otherwise require it to be ON.

As a further enhancement the temporal MVP syntax element may also include a reference to the frame that is to be used as the motion vector information reference. While standards such as VP9, HEVC, etc. have a default specification of the reference frame, when temporal MVP is turned ON against the default conditions in those standards, it may be better to specify a different reference frame other than the default reference frame. As described above, the better reference frame may be the LAST frame in the reference list, but it may alternatively be a different frame. In some embodiments, enabling prediction using a command such as the "allow_temp_mv_prediction" syntax element may be used to imply that the LAST frame in the references list is to be used as the reference frame. On the other hand, disabling the "allow_temp_mv_prediction" command with a corresponding syntax element may be used to imply that the default frame for the standard is to be used.

The syntax below shows an example of how a syntax element may be incorporated as a command into VP9. Lines 1 through 20, 24, and 25 indicate existing elements in the syntax for the uncompressed part of the header of a frame (uncompressed_header). Lines 21 to 23 indicate one approach to adding temporal motion vector prediction control to this header. In this example, an f(1) type syntax element is used to allow temporal my prediction (allow_temp_mv_prediction or temporal_mv_prediction==1). The f(1) type refers to an unsigned 1-bit number that appears directly in the bitstream. It may also invoke a particular parsing process for reading the syntax element that is specified in a coding standard, such as VP9. The syntax element may also be set equal to the return value. Another syntax element may be used to disallow temporal my prediction such as disallow_temporal_mv_prediction or temporal my prediction==0. The particular format and construction of the element may be adapted to suit different encoding systems. In this example, the additional syntax element has been added to the end of the uncompressed frame header. However, it may be placed in any other suitable position in order to improve efficiency.

The new syntax element described herein is a high level syntax element. Like other high level syntax element it is used to control the actual decoding process and the information in it is required before the actual decoding begins at the at block level. However, this new syntax element is placed in the uncompressed header. The decoding system is able to quickly decode the uncompressed header at very low complexity without decoding the whole frame. As a result, the temporal MVP syntax element is available immediately and before the whole frame is decoded.

|  | Type |
|---|---|
| uncompressed_header( ) { | |
| 1   if ( frame_type ==KEY_FRAME) { | |
| 2     ... | |
| 3     FrameIsInstra = 1 | |
| 4   } else { | |
| 5     if ( show_frame ==0 ) { | |

| | | Type |
|---|---|---|
| 6 | intra_only | f(1) |
| 7 | } else { | |
| 8 | intra_only = 0 | |
| 9 | } | |
| 10 | FrameIsIntra = intra_only | |
| | ... | |
| 11 | if (intra_only == 1) { | |
| | ... | |
| 12 | } else { | |
| 13 | refresh_frame_flags | f(8) |
| 14 | for ( i= 0; i<3; i ++) { | |
| 15 | ref_frame_idx[i] | f(3) |
| 16 | ref_frame_sign_bias[LAST_FRAME + i] | f(1) |
| 17 | } | |
| 18 | frame_size_with_refs( ) | |
| 19 | allow_high_precision_mv | f(1) |
| 20 | read_interpolation_filter( ) | |
| 21 | if(error_resilient mode == 0) { | |
| 22 | allow_temp_mv_prediction | f(1) |
| 23 | } | |
| 24 | } | |
| 25 | } | |
| ... | | |

To operate smoothly within the context of VP9 or similar coding standards, there may be some additional considerations. In some embodiments, a first inference is that when the syntax element is not present, then it may be inferred to be 0. This helps to avoid errors when there is no suitable reference frame. The overhead may also be avoided by not sending the syntax element unless MVP is enabled.

A second inference may be made in some embodiments that the temporal MVP is from the LAST frame in the frame reference list of the decoder.

In operation, a decoder may use this syntax element to invoke MVP whenever possible. In other words, the syntax element allows the decoder to maximize the use of MVP so that it is used when the normally specified conditions would indicate that it should not be used. The specific information from the decoder will be more accurate than the general assumption of the encoding standards for any particular frame. As a result, the decoder is able to make a more accurate decision as to the appropriateness of the temporal MVP for any circumstance.

Nevertheless there are still many circumstances under which temporal MVP will not be possible or may provide dissatisfactory results. One such circumstance is when the size of the current frame (frame_size) is different from the frame size (frame_size) of the reference frame. Another circumstance when temporal MVP will typically provide dissatisfactory results is when a parameter such as "FrameIsIntra" of the LAST frame is equal to 1. In both cases temporal MVP will not be invoked in some embodiments.

Motion information streamout may be required for every non-intra frame but frame buffers are then required for storing the motion information for all eight references. This increases the memory footprint when the frames are non-intra frames but any of these saved frames may potentially be used as LAST frame for later frames.

Another circumstance is when a parameter such as "show_frame" of the LAST frame is equal to 0. In this case temporal MVP will not be invoked in some embodiments.

Another circumstance is when the previous frame in the coding order is at a higher temporal layer. In this case the previous frame may not be present at the decoder.

Another circumstance is for block level sync up. Temporal MV prediction in VP9 always requires block level sync up. However, block level sync up is only needed when parallel decoding mode is enabled and LAST frame is the previous frame. Block level sync up is not required when frame level parallel decode is enabled and the LAST frame in the reference list is not the previous frame.

Figure 4:
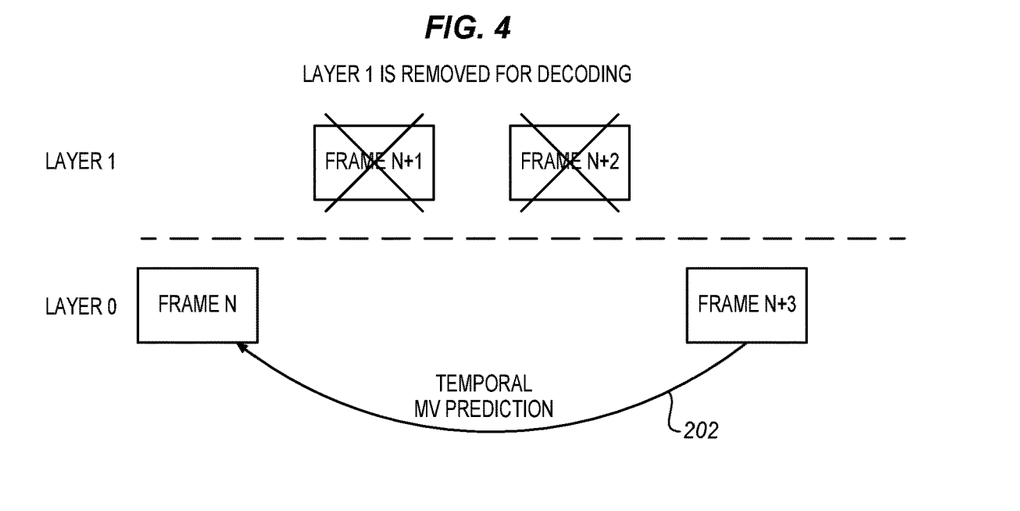
FIG. 4 is an alternative diagram of a sequence of frames that arrive at a decoder as a bitstream showing different layers of frames and a reference for temporal MVP according to an embodiment.

FIG. 4 is an alternative diagram of a sequence of frames that arrive at a decoder as a bitstream. In FIG. 4 temporal scaling is used to scale the frame rate in half. The original frame rate may be 120 fps, 60 fps, 30 fps, etc. and the decoded frame rate is 60 fps, 30 fps, or 15 fps, respectively. These frame rates are provided as examples and any other suitable frame rates may be used instead. There is a sequence of a frame N, a frame N+1, a frame N+2, and a frame N+3. The numbering of the frames is for convenience of illustration, there may be many more than 4 frames.

In this example, the intermediate frames N+1 and N+2 are at a higher layer Layer 1 and are removed for decoding by the specified criterion. Removing these frames reduces the frame rate in half. As a result temporal MVP at frame N+3 looks back 202 to frame N for temporal MVP. Frame N and frame N+3 are at Layer 0. The frames at Layer 1 are excluded and cannot be used. This approach to decoding provides correct results.

Figure 5:
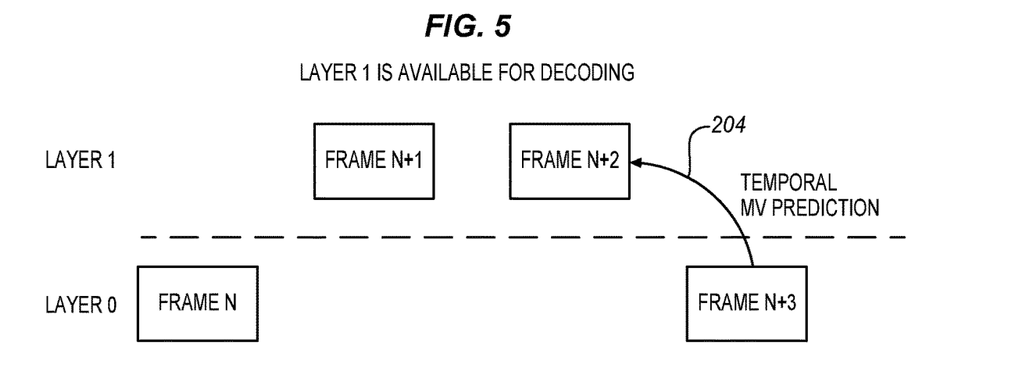
FIG. 5 is an alternative diagram of a sequence of frames that arrive at a decoder as a bitstream showing different layers of frames and an alternative reference for temporal MVP according to an embodiment.

FIG. 5 shows a difference when Layer 1 is available for decoding. The same frame sequence is shown, but, with Layer 1 available. If temporal MVP were used in this case, then Frame N+3 looks back 204 only to Frame N+2 at Layer 1. This produces an inaccurate result when the encoder did not use Layer 1. Accordingly, temporal MVP should be deactivated.

Figure 6:
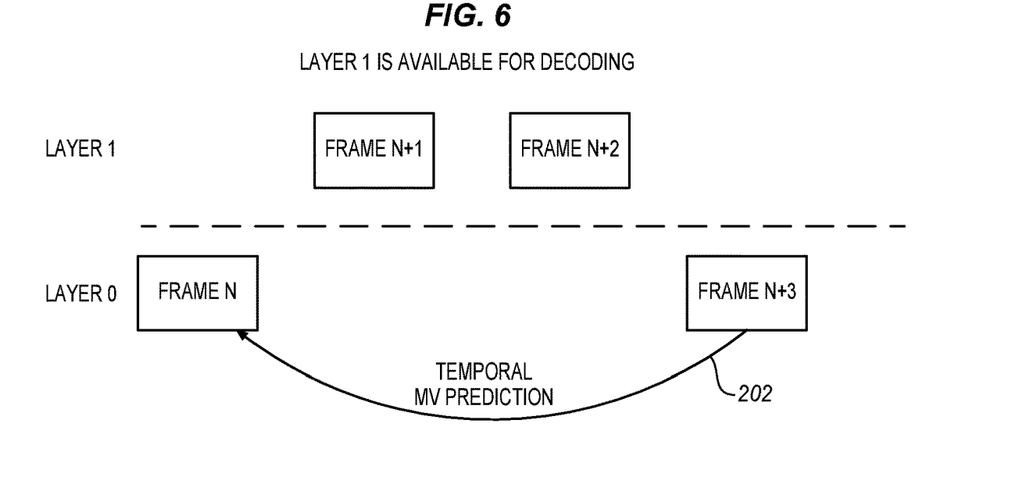
FIG. 6 is an alternative diagram of a sequence of frames that arrive at a decoder as a bitstream showing different layers of frames and a further alternative reference for temporal MVP according to an embodiment.

In FIG. 6 shows a different approach to correctly decoding the scenario in FIG. 5. In this case temporal MVP is allowed by using a syntax element, such as the syntax element described above place in a frame header. The control signal of the syntax element also indicates that Layer 1 should not be used for temporal MVP. This is particularly true as mentioned above if the encoder did not use Layer 1. Frame N+3 may refer 202 again back to Frame N. This may be done even if Layer 1 is available for decoding. When appropriate this allows for faster, better decoding as mentioned above.

Figure 7:
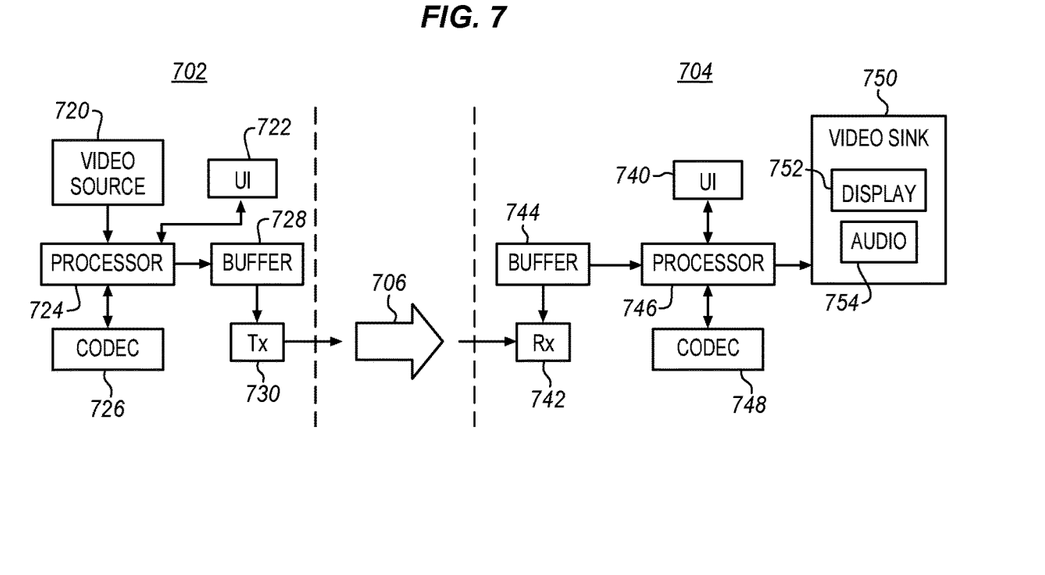
FIG. 7 is a block diagram of a source and a sink connected by a transport or channel according to an embodiment.

FIG. 7 is a block diagram of a source 702 and a sink 704 connected by a transport or channel 706. The source may be a server, production system, broadcaster, head end, or similar type of device for sending compressed video. Alternatively, it may be a computer, media player, set-top box, or other media device in any of a variety of different form factors, including desktop, notebook, tablet, or wearable. The sink 704 has a video sink component 750 that includes a display 752 such as a monitor, projector, wearable or other device to show frames from the source and an audio output 754 such as a digital to analog converter and loudspeaker to provide synchronized audio for the images.

The transport or channel may be any of a variety of different transports for video, data and other forms that is configured for compressed or encoded video transport. Typically the transport is an Internet connection but may be a wide, metropolitan, or local area network or a broadcast channel from terrestrial or satellite transmitters. Alternatively, the transport may be wired such as DisplayPort, Thunderbolt, or USB (Universal Serial Bus), etc. or wireless, such as WiDi (Wireless Display), WDA (Wireless Display Adapter), Miracast, AirPlay, etc. The transport may connect two remotely separate devices, such as a head end and a computer or set-top box, or it may connect two nearby devices. In some embodiments, the transport may be a storage device to which both the source and the sink are connected. The encoding is then useful for reducing storage requirements.

The source device 702 has a media or video source 720, such as a memory, memory player, disk player, or camera and a user interface 722. These are applied to a processor 724 which is coupled to a codec (coder/decoder) 726 which assists with compressing and decompressing any received or transmitted video as described above. The codec may be hardware or software and may also assist with other tasks. The processor is also coupled to a frame buffer 728 which includes or is coupled to a transmitter 730. The buffer receives encoded frames for transmission through the transmitter 730 across the transport 706.

The codec may be a part of the processor or a separate unit. The codec may be a graphics processing unit or a separate workstation or server component. The processor may be an additional full general purpose processor or a particular dedicated controller for use with the source, such as a DSP (Digital Signal Processor) or FPGA (Field Programmable Gate Array). There may also be other sources such as cameras, telephone transceivers, etc., additional processors, and additional components as shown, for example, in FIG. 7.

The frames in the buffer are sent through the transport or channel to the sink device 704 which connects to the transport through a receiver 742. The receiver 742 passes the frames to a buffer 744 that stores the encoded frames for processing. A processor 746 takes the frames from the buffer and with a possible additional codec or decoder 748 decompresses or decodes any compressed frames and forwards the decompressed frames to the video sink block 750. The processor and codec may also scale the frames for display, add any on-screen display from the sink, and perform any mixing, blending, or calibration to the frames. A user interface 740 coupled to the processor allows commands and data to be applied to the sink device 704 and may provide information to the user through the video sink. The video sink renders the images to the display panel 752, projector, transducer or any other type of display device. The video sink also passes any audio component to an audio DAC (Digital Analog Converter) and loudspeaker 754, headphones, or any other suitable audio device. The DAC and the audio device may be internal or external to the sink.

The source and sink are provided only as examples and may have more or fewer features than those shown. The described techniques and system may be implemented on both the source and sink side of a transport. The techniques may be implemented with no changes in the system except for those described herein. In some cases, the transport may be augmented with signaling, such as a transmission control protocol or various control layers to indicate the nature and type of compression being used, if any.

Figure 8:
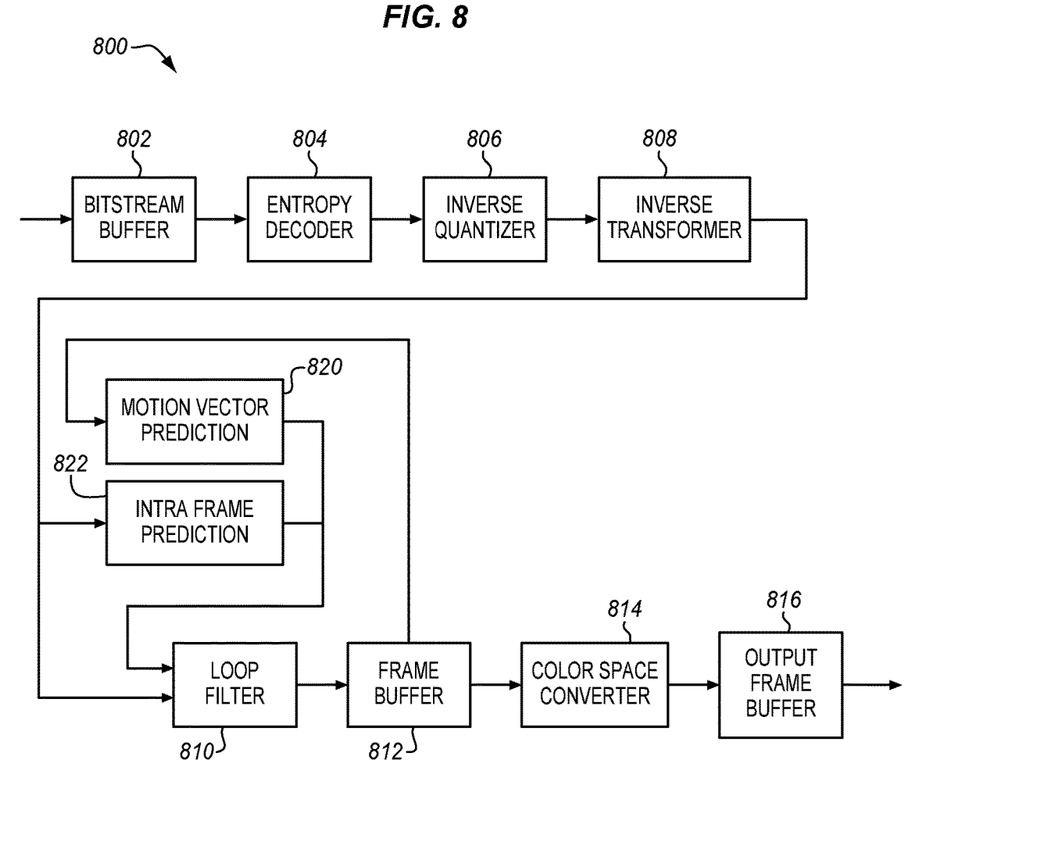
FIG. 8 is a block diagram of a decoder suitable for use in the example of FIG. 7 according to an embodiment.

FIG. 8 is a block diagram of a decoder 800 suitable for use in the example of FIG. 7 and may be implemented in the codec 748, processor 746 or both. The decoder is structured in particular for use with VP9 but other types of decoders are similar and there may be variations on the decoder and decoding process to suit advancements, improvements and particular implementations.

The encoded video is received as a bitstream in a buffer 802. This may be the same buffer 744 that is attached to the sink's 704 receiver 742 or it may be another buffer of the decoding mechanism 800. The bitstream may be configured in any of a variety of different ways and may include frames, superframes, slices, and various headers that are compressed or uncompressed. An entropy decoder 804 performs entropy decoding or any other suitable type of decoding on the input bitstream to generate quantized coefficients of prediction units, coding units and other elements of the bitstream. An inverse quantizer 806 de-quantizes the quantized transform coefficients. An inverse transformer 808 performs an inverse transformation and de-quantized transform coefficients, to reconstruct the predictive units. These correspond to the frames, superframes, headers and other components of the encoded video.

The frames are applied to a loop filter 810 to reduce blocking artifacts and other distortions of the encoding and decoding process. The frames are then stored in a frame buffer 812. The stored frames are then color converted in a color space converter 814 and sent to an output frame buffer 816. The color space converter may be used to convert the frames from a color space of the encoder, such as YCrCb to a color space of the video sink such as RGB. From the output frame buffer, the frames may be transmitted to the video sink 750 for display.

An intra frame or spatial prediction block 822 receives the frames, in the form of coding units and predictive units from the inverse transformer and fills in additional pixels for the frames using intra frame prediction. These partially filled in frames are then fed back to the loop filter 810 for use in removing various artifacts including those from the blockwise approach used by the intra frame prediction. In addition a motion vector or temporal prediction block 820 receives multiple frames from the frame buffer after the spatial prediction and generates additional pixels using temporal motion vector prediction.

The reconstructed predictive units from the inverse transformer are added to the spatial and temporal predictions and the combinations are filtered in the loop filter. The loop filter may perform any of a variety of different functions depending on the particular decoding system. The intra frame prediction block receives decoded prediction directions that are used to generate the pixels in the frame. Similarly the temporal motion vector prediction block may also receive instructions as discussed above, such as allow motion vector prediction and a reference to LAST frame or another frame. Reference frames may be pulled from the frame buffer 812 for use in the motion vector prediction. The decoded motion vectors are then used to determine predictive units that are also sent to the loop filter.

Figure 9:
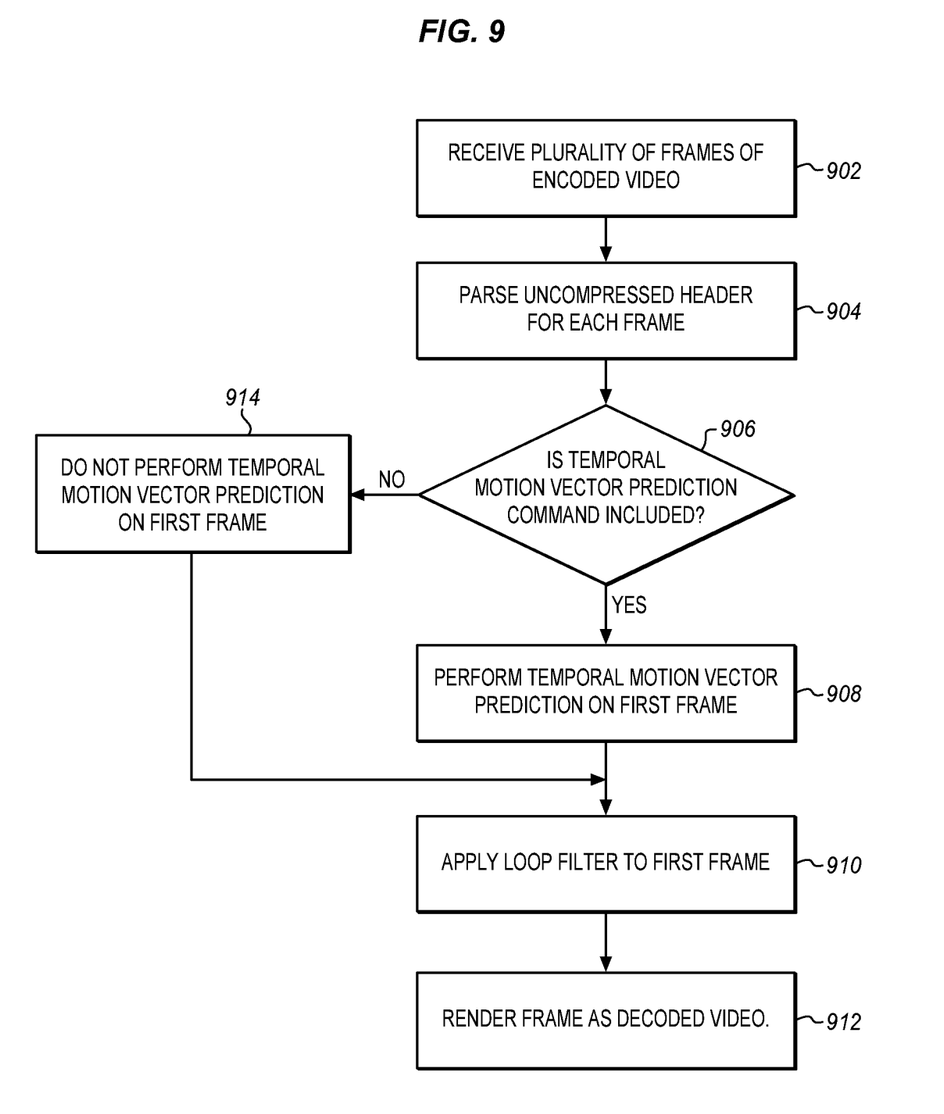
FIG. 9 is a process flow diagram of decoding video frames according to an embodiment.

FIG. 9 is a process flow diagram of applying the described control signal or syntax element in the motion vector prediction block 820. The process begins at 902 with receiving a sequence of frames representing encoded video at a bitstream buffer. The sequence of frames has been encoded for storage or transmission and the frames are received as a bitstream at a decoder. The decoder at 904 parses the headers of each frame including the uncompressed header for each frame.

With the headers parsed, the decoder can read any included commands. Accordingly, the decoder decides at 906 whether a temporal motion vector prediction command is included within the parsed uncompressed header of each frame. This command may take a variety of different forms. As shown and described above, the command may be in the form of a syntax element of a particular type, such as f(1) in the header of the frame.

If the command is found, then it is interpreted to determine whether to perform temporal motion vector prediction. In a simple version, the presence of a command, such as "allow temporal MV prediction" means that the prediction will be performed. In other versions, the command will have a value or be present only as a value such as a binary ON/OFF element to determine that the prediction be turned ON or OFF. In other versions the command will be to change state. In other versions, the command is always present. In other versions, the command is only present to override default settings or decisions. The particular form of the command may be adapted to suit particular encoding systems. The command is inserted by the encoder to better control the decoder and obtain better results in the final video sequence. In some embodiments, the temporal motion vector prediction command may include a reference to motion vector information from a frame listed in a reference list. The listed frame may be a LAST frame or any other suitable frame. The reference frame may be referred to implicitly by the presence of the command or the form of the command or it may be explicit and included in or near the command.

If the prediction is commanded then at 908 temporal motion vector prediction is performed on the frame corresponding to the parsed uncompressed header. The motion predicted frame is then applied to a loop filter at 910 and any other suitable processing is performed to render the frame as encoded video at 912. The other processing may include further spatial and temporal prediction and extrapolation, scaling, color correction and more, depending on the particular decoding system. Finally at 910 the frame is rendered as decoded video. The frame of the video may be rendered to storage, to transmission, to display or to all three.

If there is no temporal motion vector prediction command included within the parsed header or if the command is a no or OFF command, then at 914 temporal motion vector prediction is not performed on the respective frame. The frame is passed directly to the loop filter at 910 for the additional processing mentioned above.

The described process allows the default conditions to be overridden for all cases or just for special cases. As an example, when the first frame follows a second frame that has a higher temporal ID. The error resiliency mode of the temporal motion vector prediction can be cancelled to ensure that motion vector prediction is performed. In addition for temporal scaling non-shown frames can be used.

Figure 10:
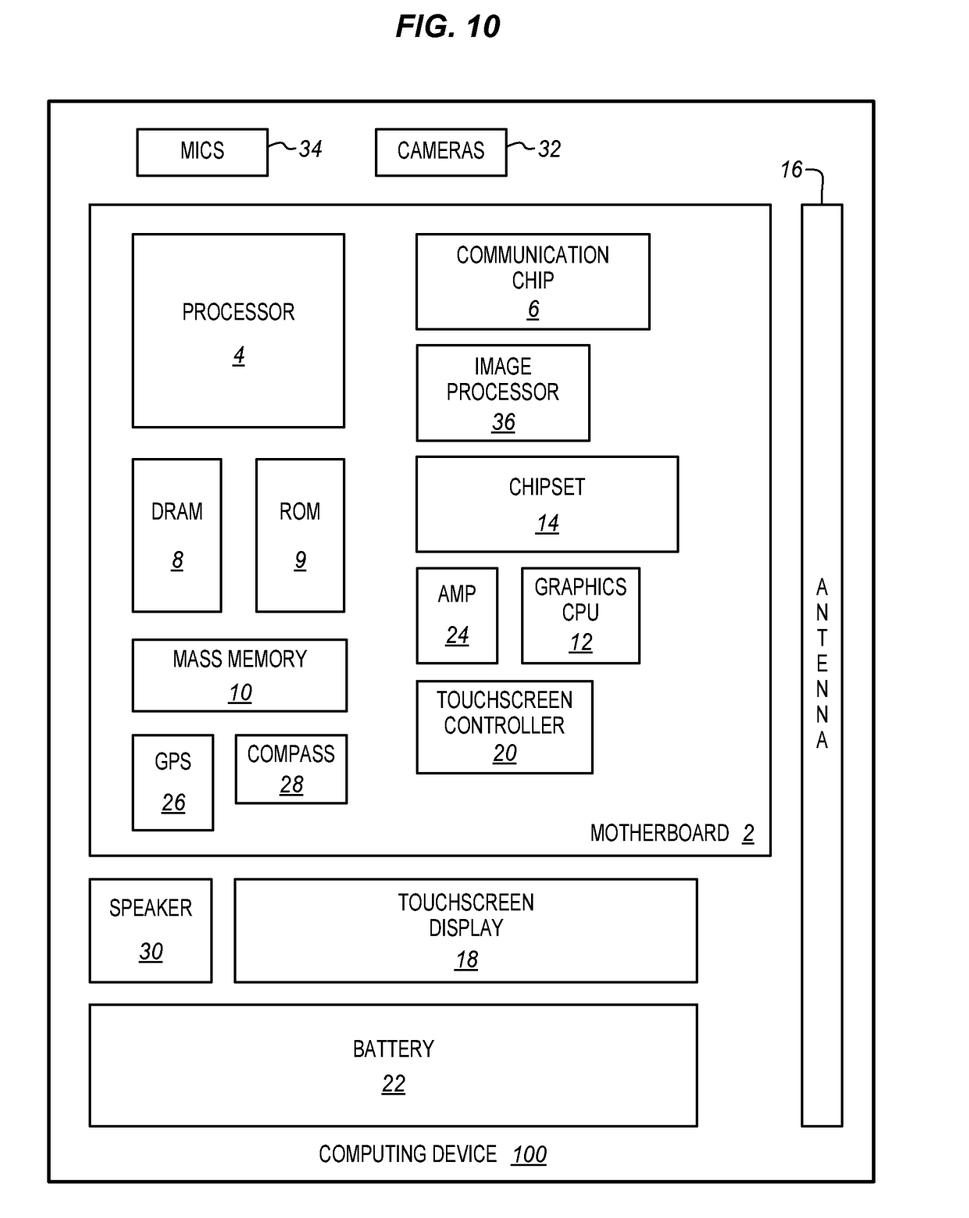
FIG. 10 is a block diagram of a computing device suitable for video capture and encoding according to an embodiment.

FIG. 10 is a block diagram of a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The processor 4 and the graphics CPU 12 are coupled to DRAM 8 and other memory assets to perform the decoding functions described herein. The rendered frames may be sent through the communication chip 6 to an external device or provided to the display 18. The processor 4 is coupled to the image processing chip to drive the processes, set parameters, etc. The image processing chip may perform video codec functions as described above or these functions may be implemented using the graphics CPU, a chipset component, a core of the processor, or a different component of the system. All of these components may be incorporated into a SOC or fabricated as one or more different chips connected together.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims. The various features of the different embodiments may be variously combined with some features included and others excluded to suit a variety of different applications.

Some embodiments pertain to a method that includes receiving a plurality of frames representing encoded video, parsing an uncompressed header for each frame, determining whether a temporal motion vector prediction command is included within the parsed uncompressed header of a first frame, selecting a reference frame from a reference list of frames, retrieving motion vector information from the selected reference frame, performing temporal motion vector prediction on the first frame corresponding to the parsed uncompressed header if a temporal motion vector prediction command is included within the parsed header to form a motion predicted frame, applying a loop filter to the motion predicted frame, and rendering the frame as decoded video.

In further embodiments the temporal motion vector prediction command is a syntax element indicating that temporal motion vector prediction is enabled at the frame level.

In further embodiments the plurality of frames are received as a bitstream of a decoder.

In further embodiments the temporal motion vector prediction command is a syntax element in a form of a binary ON/OFF element.

In further embodiments the temporal motion vector prediction command includes a reference to the motion vector information from the selected reference frame.

In further embodiments the selected frame is a LAST frame.

In further embodiments the reference to the motion vector information is implicit in the temporal motion vector prediction command.

Further embodiments include not performing temporal motion vector prediction on the first frame if the temporal motion vector prediction command is not included within the parsed header.

In further embodiments an absence of the syntax element indicates that temporal motion vector prediction is disabled.

In further embodiments the first frame follows a second frame that has a higher temporal ID so that the temporal motion vector prediction command overrides an error resiliency mode of the temporal motion vector prediction.

In further embodiments performing temporal motion vector prediction comprises performing temporal motion vector prediction on all subsequent frames until it is determined that a temporal motion vector prediction command is included within the parsed uncompressed header of a subsequent frame.

Some embodiments pertain to a video decoder that includes a buffer to receive a plurality of frames representing encoded video, a parser to parse an uncompressed header for each frame, a memory to store a reference list of frames, a motion vector predictor to determine whether a temporal motion vector prediction command is included within the parsed uncompressed header of a first frame, to select a reference frame from the reference list of frames, to retrieve motion vector information from the selected reference frame and to perform temporal motion vector prediction on the first frame corresponding to the parsed uncompressed header if a temporal motion vector prediction command is included within the parsed header to form a motion predicted frame, a loop filter to filter the motion predicted frame, and an output frame buffer to store the filtered frame as a frame of decoded video.

In further embodiments the temporal motion vector prediction command is a syntax element indicating that temporal motion vector prediction is enabled at the frame level.

In further embodiments the temporal motion vector prediction command is a syntax element in a form of a binary ON/OFF element.

In further embodiments the selected frame is a LAST frame.

In further embodiments an absence of the syntax element indicates that temporal motion vector prediction is disabled.

In further embodiments the first frame follows a second frame that has a higher temporal ID so that the temporal motion vector prediction command overrides an error resiliency mode of the temporal motion vector prediction.

Some embodiments pertain to a computing system that includes a bitstream buffer to receive a plurality of frames representing encoded video, a memory to store a reference list of frames, a graphics processor to parse an uncompressed header for each frame, to determine whether a temporal motion vector prediction command is included within the parsed uncompressed header of a first frame, to select a reference frame from the reference list of frames, to retrieve motion vector information from the selected reference frame and to perform temporal motion vector prediction on the first frame corresponding to the parsed uncompressed header if a temporal motion vector prediction command is included within the parsed header to form a motion predicted frame, and to filter the motion predicted frame, and a display to render the filtered frame as decoded video.

In further embodiments the temporal motion vector prediction command includes a reference to the motion vector information from the selected reference frame.

In further embodiments performing temporal motion vector prediction comprises performing temporal motion vector prediction on all subsequent frames until it is determined that a temporal motion vector prediction command is included within the parsed uncompressed header of a subsequent frame.

What is claimed is:
1. A method comprising:
receiving a plurality of frames of encoded video;
parsing an uncompressed frame-level header of at least one frame wherein the frame-level header is transmitted without using arithmetic encoding on the frame-level header;

determining whether a temporal motion vector prediction command is included within the frame-level header; and performing temporal motion vector prediction on the at least one frame according to a temporal motion vector prediction command included within the frame-level header to form a motion predicted frame.

2. The method of claim 1, wherein the temporal motion vector prediction command is a syntax element indicating that temporal motion vector prediction is enabled at the frame level.

3. The method of claim 1, wherein the plurality of frames are received as a bitstream at a decoder.

4. The method of claim 1, wherein the temporal motion vector prediction command is a syntax element in a form of a binary ON/OFF element.

5. The method of claim 1, wherein the temporal motion vector prediction command includes a reference to motion vector information from a selected reference frame.

6. The method of claim 5, wherein the selected reference frame is a LAST frame in a reference list.

7. The method of claim 5, wherein the reference to the motion vector information is implicit in the temporal motion vector prediction command.

8. The method of claim 1, further comprising not performing temporal motion vector prediction on a first frame when the temporal motion vector prediction command is not included within the frame-level header of the first frame.

9. The method of claim 1, wherein an absence of a syntax element from the frame-level header indicates that temporal motion vector prediction is disabled.

10. The method of claim 1, wherein the at least one frame is a first frame that follows a second frame that has a higher temporal ID than the first frame so that the temporal motion vector prediction command overrides an error resiliency mode of the temporal motion vector prediction.

11. The method of claim 1, wherein performing temporal motion vector prediction comprises performing temporal motion vector prediction on all subsequent frames relative to a frame with the temporal motion vector prediction command until a temporal motion vector prediction command is included within the frame-level header of a subsequent frame.

12. A video decoder comprising:
a buffer to receive a plurality of frames of encoded video;
a parser to parse an uncompressed frame-level header for individual frames wherein the frame-level header is transmitted to a decoder without using arithmetic encoding on the frame-level header; and
a motion vector predictor arranged to operate by:
determining whether a temporal motion vector prediction command is included within the frame-level header, and
performing temporal motion vector prediction on the at least one frame according to a temporal motion vector prediction command included within the frame-level header to form a motion predicted frame.

13. The decoder of claim 12, wherein the temporal motion vector prediction command is a syntax element indicating that temporal motion vector prediction is enabled at the frame level.

14. The decoder of claim 13, wherein the temporal motion vector prediction command is a syntax element in a form of a binary ON/OFF element.

15. The decoder of claim 12, wherein the motion vector predictor is arranged to select a reference frame that is a LAST frame in a reference list.

16. The decoder of claim 12, wherein an absence of a syntax element at the frame-level header indicates that temporal motion vector prediction is disabled.

17. The decoder of claim 12, wherein the first frame follows a second frame that has a higher temporal ID so that the temporal motion vector prediction command overrides an error resiliency mode of the temporal motion vector prediction.

18. A computing system comprising:
a bitstream buffer to receive a plurality of frames of an encoded video and comprising an uncompressed frame-level header of at least one frame wherein the frame-level header was transmitted without using arithmetic encoding on the frame-level header; and
at least one processor communicatively coupled to the buffer and being arranged to operate by:
determining whether a temporal motion vector prediction command is included within the frame-level header; and
performing temporal motion vector prediction on the at least one frame according to a temporal motion vector prediction command included within the frame-level header to form a motion predicted frame.

19. The computing system of claim 18, wherein the temporal motion vector prediction command includes a reference to motion vector information from a selected reference frame.

20. The computing system of claim 18, wherein performing temporal motion vector prediction comprises performing temporal motion vector prediction on all subsequent frames until it is determined that a temporal motion vector prediction command is included within the frame-level header of a subsequent frame.

21. The computing system of claim 18, wherein the temporal motion vector prediction command is a syntax element indicating that temporal motion vector prediction is enabled at the frame level.

22. An encoder comprising:
a buffer to hold a plurality of compressed frames of encoded video to be transmitted to a decoder; and
at least one processor arranged to operate by:
setting a temporal motion vector prediction command at a frame-level header of at least one of the frames, and
transmitting the frame-level header without using arithmetic encoding on the frame-level header so that a decoder can perform temporal motion vector prediction on the at least one frame according to the temporal motion vector prediction command.

23. The encoder of claim 22, wherein the temporal motion vector prediction command is a syntax element indicating that temporal motion vector prediction is enabled at the frame level.

24. The encoder of claim 22, wherein the temporal motion vector prediction command is a syntax element in a form of a binary ON/OFF element.

25. The encoder of claim 22, wherein an absence of the syntax element indicates that temporal motion vector prediction is disabled.

* * * * *